United States Patent
Fu et al.

(10) Patent No.: US 10,389,525 B2
(45) Date of Patent: Aug. 20, 2019

(54) METHOD, APPARATUS, AND SYSTEM FOR QUANTUM KEY DISTRIBUTION, PRIVACY AMPLIFICATION, AND DATA TRANSMISSION

(71) Applicant: Alibaba Group Holding Limited, Grand Cayman (KY)

(72) Inventors: Yingfang Fu, Beijing (CN); Shuanlin Liu, Hangzhou (CN); Yabin Gao, Beijing (CN); Li Xiao, Hangzhou (CN); Junying Pang, Hangzhou (CN); Xiuzhong Chen, Hangzhou (CN); Liang Feng, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 351 days.

(21) Appl. No.: 14/929,072

(22) Filed: Oct. 30, 2015

(65) Prior Publication Data
US 2016/0149700 A1    May 26, 2016

(30) Foreign Application Priority Data

Oct. 30, 2014   (CN) .......................... 2014 1 0598965

(51) Int. Cl.
*H04L 9/08* (2006.01)
(52) U.S. Cl.
CPC .................................. *H04L 9/0852* (2013.01)
(58) Field of Classification Search
CPC .................................................... H04L 9/0852
(Continued)

(56) References Cited

U.S. PATENT DOCUMENTS

| 5,515,438 A | 5/1996 | Bennett et al. |
| 6,678,054 B1 | 1/2004 | Dress et al. |

(Continued)

FOREIGN PATENT DOCUMENTS

| CN | 102113268 A | 6/2011 |
| CN | 102904726 | 1/2013 |

(Continued)

OTHER PUBLICATIONS

Mendes, A. J. B., Paulicena, E. H., De Souze, W. A. R., Quantum Cryptography: A Direct Approach, Journal, 2011, pp. 39-48, vol. 8, Revista De Sistemas De Informacao Da FSMA.

(Continued)

*Primary Examiner* — Kambiz Zand
*Assistant Examiner* — Benajmin A Kaplan

(57) ABSTRACT

A method and apparatus for quantum key distribution comprised of a privacy amplification method and device for the quantum key distribution process as well as a data transmission method and system based on quantum keys is provided, wherein the quantum key distribution method includes the following process: obtaining a bit stream of the same basis vector by sending or receiving coding quantum states of random bit streams and comparing those measurements obtained with the measurement basis vector; in accordance with a preset manner, extracting parameter information associated with privacy amplification and initial key information from the bit stream of the same basis vector after error correction; and using the initial key as an input to implement the privacy amplification algorithm based on the parameter information and thereby obtain shared quantum keys. Utilization of the method detailed herein can eliminate security risks in the negotiation of privacy amplification parameters in the alternative channel and effectively improve the security of quantum key distribution processes.

42 Claims, 7 Drawing Sheets

(58) Field of Classification Search
USPC .......................................................... 380/278
See application file for complete search history.

(56) References Cited

U.S. PATENT DOCUMENTS

| | | | |
|---|---|---|---|
| 7,305,091 B1 * | 12/2007 | Hirano | H04B 10/70 380/255 |
| 7,451,292 B2 | 11/2008 | Routt | |
| 7,471,793 B2 | 12/2008 | Bonfrate et al. | |
| 7,570,767 B2 | 8/2009 | Lo | |
| 7,577,257 B2 | 8/2009 | Xia et al. | |
| 7,602,919 B2 | 10/2009 | Berzanskis et al. | |
| 7,620,182 B2 | 11/2009 | Berzanskis et al. | |
| 7,653,199 B2 | 1/2010 | Renes | |
| 7,706,536 B2 | 4/2010 | Dinu et al. | |
| 7,831,049 B1 | 11/2010 | Kanter | |
| 7,864,958 B2 | 1/2011 | Harrison et al. | |
| 7,889,868 B2 | 2/2011 | Wellbrock et al. | |
| 8,082,443 B2 | 12/2011 | Troxel et al. | |
| 8,180,056 B2 | 5/2012 | Kuang | |
| 8,189,785 B2 | 5/2012 | Donnangelo et al. | |
| 8,205,134 B2 | 6/2012 | Harrison et al. | |
| 8,311,224 B2 | 11/2012 | Chen et al. | |
| 8,332,730 B2 | 12/2012 | Harrison et al. | |
| 8,483,394 B2 | 7/2013 | Nordholt et al. | |
| 8,488,790 B2 | 7/2013 | Vvellbrock et al. | |
| 8,559,640 B2 | 10/2013 | Mohd et al. | |
| 8,582,770 B2 * | 11/2013 | Tomaru | H04B 10/70 380/256 |
| 8,611,535 B2 | 12/2013 | Brodsky et al. | |
| 8,639,927 B2 | 1/2014 | Choi et al. | |
| 8,639,932 B2 | 1/2014 | Wiseman et al. | |
| 8,650,401 B2 | 2/2014 | Wiseman et al. | |
| 8,654,979 B2 | 2/2014 | Hicks | |
| 8,675,876 B2 | 3/2014 | Yamamoto et al. | |
| 8,683,192 B2 | 3/2014 | Ayling et al. | |
| 8,693,691 B2 | 4/2014 | Jacobs | |
| 8,699,876 B2 | 4/2014 | Brodsky et al. | |
| 8,755,525 B2 | 6/2014 | Wiseman | |
| 8,774,638 B2 | 7/2014 | Duligall et al. | |
| 8,781,129 B2 | 7/2014 | Bush et al. | |
| 8,842,839 B2 | 9/2014 | Harrison et al. | |
| 8,855,316 B2 | 10/2014 | Wiseman et al. | |
| 8,885,828 B2 | 11/2014 | Wiseman et al. | |
| 8,891,767 B2 | 11/2014 | Zubairy et al. | |
| 8,903,094 B2 | 12/2014 | Bovino | |
| 8,929,554 B2 | 1/2015 | Hughes et al. | |
| 8,964,989 B2 | 2/2015 | Grice | |
| 8,990,583 B1 | 3/2015 | McEachron | |
| 9,002,009 B2 | 4/2015 | Nordholt et al. | |
| 9,031,236 B2 | 5/2015 | Donnangelo et al. | |
| 9,077,577 B1 | 7/2015 | Ashrati et al. | |
| 9,112,677 B2 | 8/2015 | Tanaka et al. | |
| 9,148,225 B2 | 9/2015 | Lowans et al. | |
| 9,160,529 B2 | 10/2015 | Tajima et al. | |
| 9,178,623 B2 | 11/2015 | Chen et al. | |
| 9,219,605 B2 | 12/2015 | Niskanen et al. | |
| 9,252,986 B2 | 2/2016 | Ashrati et al. | |
| 9,258,114 B2 | 2/2016 | Jezwski et al. | |
| 9,294,280 B2 | 3/2016 | Malaney | |
| 9,331,875 B2 | 5/2016 | Ashrati et al. | |
| 2004/0064351 A1 | 4/2004 | Mikurak | |
| 2004/0107125 A1 | 6/2004 | Guheen et al. | |
| 2004/0109564 A1 | 6/2004 | Cerf et al. | |
| 2005/0015471 A1 | 1/2005 | Zhang et al. | |
| 2005/0027862 A1 | 2/2005 | Nguyen et al. | |
| 2005/0036624 A1 | 2/2005 | Kent et al. | |
| 2005/0180575 A1 | 8/2005 | Maeda et al. | |
| 2006/0059253 A1 | 3/2006 | Goodman et al. | |
| 2006/0059343 A1 | 3/2006 | Berzanskis et al. | |
| 2006/0167784 A1 | 7/2006 | Hoffberg | |
| 2006/0178918 A1 | 8/2006 | Mikurak | |
| 2007/0087756 A1 | 4/2007 | Hoffberg | |
| 2007/0192598 A1 | 8/2007 | Troxel et al. | |
| 2007/0230688 A1 * | 10/2007 | Tajima | H04L 9/0858 380/30 |
| 2008/0037790 A1 | 2/2008 | Berzanskis et al. | |
| 2008/0144833 A1 | 6/2008 | Matsumoto | |
| 2008/0147820 A1 | 6/2008 | Maeda et al. | |
| 2009/0106553 A1 | 4/2009 | Wang | |
| 2009/0265541 A1 | 10/2009 | Ylitalo et al. | |
| 2009/0268901 A1 | 10/2009 | Lodewyck et al. | |
| 2010/0235285 A1 | 9/2010 | Hoffberg | |
| 2011/0004513 A1 | 1/2011 | Hoffberg | |
| 2011/0126011 A1 | 5/2011 | Choi et al. | |
| 2011/0170690 A1 | 7/2011 | Shpantzer | |
| 2011/0251868 A1 | 10/2011 | Mikurak | |
| 2011/0280397 A1 | 11/2011 | Patwar et al. | |
| 2011/0317420 A1 | 12/2011 | Jeon et al. | |
| 2012/0087500 A1 | 4/2012 | Ukita et al. | |
| 2012/0089410 A1 | 4/2012 | Mikurak | |
| 2012/0198228 A1 | 8/2012 | Oberheide et al. | |
| 2012/0259722 A1 | 10/2012 | Mikurak | |
| 2012/0314863 A1 | 12/2012 | Troupe et al. | |
| 2013/0083926 A1 * | 4/2013 | Hughes | H04L 9/0836 380/278 |
| 2013/0251145 A1 | 9/2013 | Lowans et al. | |
| 2013/0315395 A1 | 11/2013 | Jacobs | |
| 2014/0081793 A1 | 3/2014 | Hoffberg | |
| 2014/0222610 A1 | 8/2014 | Mikurak | |
| 2014/0310243 A1 | 10/2014 | McGee et al. | |
| 2014/0337472 A1 | 11/2014 | Newton et al. | |
| 2014/0344391 A1 | 11/2014 | Varney et al. | |
| 2014/0344399 A1 | 11/2014 | Lipstone et al. | |
| 2014/0344400 A1 | 11/2014 | Varney et al. | |
| 2014/0344401 A1 | 11/2014 | Varney et al. | |
| 2014/0344425 A1 | 11/2014 | Varney et al. | |
| 2014/0344452 A1 | 11/2014 | Lipstone et al. | |
| 2014/0344453 A1 | 11/2014 | Varney et al. | |
| 2015/0036824 A1 * | 2/2015 | Dixon | H04L 9/0852 380/279 |
| 2015/0222619 A1 * | 8/2015 | Hughes | H04L 63/08 713/168 |
| 2016/0285621 A1 * | 9/2016 | Yuen | H04L 9/065 |

FOREIGN PATENT DOCUMENTS

| | | |
|---|---|---|
| WO | 2014035696 | 3/2014 |
| WO | 2014035696 A2 | 3/2014 |
| WO | 2015055257 | 4/2015 |

OTHER PUBLICATIONS

Chip Elliot et al. "Current Status of the Darpa Quantum Network (Invited Paper)" Proceedings Optical Diagnostics of Living Cells II, Vo. 5815, May 25, 2005, pp. 138-149.

* cited by examiner

METHOD, APPARATUS, AND SYSTEM FOR QUANTUM KEY DISTRIBUTION, PRIVACY AMPLIFICATION, AND DATA TRANSMISSION

CROSS-REFERENCE TO RELATED APPLICATION

The application claims the benefits to Chinese Patent Application No. 201410598965.5, filed on Oct. 30, 2014, which is incorporated herein by reference in its entirety.

TECHNICAL FIELD

The present disclosure relates generally to the field of quantum key and, more particularly, to methods for quantum key distribution. The present disclosure also provides an apparatus and process for quantum key distribution, a privacy amplification method, as well as a data transmission method and system based on quantum keys.

BACKGROUND

The security level of classical cryptography is based on computational complexities such as discrete algorithm, factoring, and other difficult considerations. However, the rapid improvement in computing capabilities offered by cloud computing, quantum computing, etc. has enabled the potential for the deciphering of classical cryptography methodology. Accordingly, due to this change in circumstances, classical cryptography is facing significant challenges in the modern age; the unique security level afforded by quantum cryptography has brought this form of cryptography to the forefront of attention, thereby establishing its relevance.

As a cross product of quantum mechanics and cryptography, the security of quantum cryptography is guaranteed by the doctrine of quantum mechanics, which is based on quantum principles that exist regardless of an attacker's computing capability and storage capacity. The basic principles of quantum mechanics include the following: the uncertainty principle of unknown quantum states, the principle of measurement collapse, non-cloning principle, etc. According to these principles, any operation that attempts to intercept or measure quantum keys will result in a change in the quantum states. As a result of such changes in the quantum states, an eavesdropper or hacker would only be able to obtain insignificant information. Additionally, a legitimate receiver of the information could discover from changes in quantum states that the quantum passwords have been intercepted or compromised.

Based on the characteristics of quantum passwords, a quantum key distribution protocol such as BB84 has been proposed. The communicating parties using these protocols would share a set of secure keys for encrypting and decrypting information. Quantum key distribution processes typically include the following steps: 1) Initially, an original key negotiation phase takes place. Here, a sender would first load certain key information into the quantum states via a modulation process and then send the loaded information to a receiving party or receiver through a quantum channel. From there, the receiver would measure the received quantum states in a random manner; 2) Next, there is a key-screening stage in which two communicating parties would screen the original keys by comparing the measurement base vector of each measurement through classical communication channels; 3) At the third step, the parties would determine whether it is necessary to discard the present key distribution process for another by estimating and analyzing the bit error rate in the transmission process; 4) During a data negotiation phase, parties through a classical channel are able to correct part of the remaining keys (i.e., error correction) and obtain a shared initial key; 5) Finally, there is a privacy amplification phase (i.e., privacy enhancement or secrecy enhancement phase), in which the parties first use privacy amplification algorithms to minimize the amount of information that could possibly be obtained by an eavesdropper and then confirm that the communicating parties end up obtaining a set of shared quantum keys that are unconditionally secure (i.e., shared keys).

Additionally, hash functions are used to implement the above privacy amplification phase. To elaborate, in the privacy amplification phase, the same hash function libraries, which are preset in the quantum devices of the communicating parties, are coupled with description characters of the hash function (i.e., the parameter associated with the implementation of hash functions) that are selected by a negotiation of the communicating parties through classical channels. After reaching an agreement between the communicating parties, initial keys obtained in the data negotiation phase are then input to generate the final shared keys by using the same hash function as that in the privacy amplification phase.

Although quantum cryptography has advantages by virtue of its principles, defects present in the light source device or channels can make it possible for an eavesdropper to hack the quantum channel transmission process and obtain part of the key information—as well as any subsequent data being processed—through the hacking process. For example, due to a lack of ideal single photon source(s), there is a loss in the channel, subsequently resulting in limited detector efficiency, etc. This occurs because weak coherent light sources are often used instead of ideal single photon sources. Accordingly, the existence of multi-photon pulses in the weak coherent light source makes it possible for an eavesdropper to carry out beam-splitting attacks (i.e., PNS attack). To counter such beam-splitting attacks, a decoy-state quantum key distribution scheme is used, in which the sender introduces a single photo decoy-state that pulses with different randomly-generated intensities. However, an eavesdropper may still be able to distinguish the information state from the decoy state by carrying out statistical studies of the fluctuation of the light intensity. As a result, even this type of system may be vulnerable and an eavesdropper may still obtain some quantum key information.

Under these circumstances, the privacy amplification phase aimed at reducing the amount of information the eavesdropper can get becomes more important. However, because the parameter negotiation process has already been completed in classical channels, there is not only an increased risk of eavesdropping, but also other eavesdropping actions in classical channels which may not be detected by the communicating parties. Thus, it is clear that noticeable security risks exist which must be addressed.

SUMMARY OF THE DISCLOSURE

Embodiments of the present disclosure provide mechanisms based on quantum keys for eliminating security risks in the quantum key distribution process caused by negotiating privacy amplification parameters in classical channels.

Consequently, one embodiment of the present disclosure employs methods of quantum key distribution. The method includes the following: obtaining a bit stream of the same basis vector by sending or receiving coding quantum states of random bit streams and comparing those measurements obtained with the measurement basis vectors; extracting parameter information and initial keys associated with privacy amplification from the bit stream of the same basis vector after error-correction in a preset manner; and acquiring shared quantum keys by using initial keys as input to implement the privacy amplification algorithm based on the parameter information.

According to another embodiment of the present disclosure for quantum key distribution, the device comprises a bit stream acquisition module used for obtaining a bit stream of the same basis vector by sending or receiving coding quantum states of random bit streams and comparing those with the measurement basis vectors. After error correction in a preset manner, a parameter extraction module is then used to extract parameter information and initial keys associated with privacy amplification from said bit stream of the same basis vector. Finally, a privacy amplification module uses initial keys as input to implement the privacy amplification algorithm and obtain the shared quantum key based on the parameter information.

According to yet another embodiment of the present disclosure, the data transmission method based on quantum key includes the following steps: the sender uses the shared quantum key to encrypt data to be transmitted and then sends the encrypted data to the receiver; the receiver utilizes the same shared quantum key to decrypt the data received; during the quantum key distribution process, the sender's and receiver's quantum communication device (that exists in the same trusted network as the sender and the receiver respectively) obtains a shared quantum key to be used by both the sender and receiver.

Furthermore, the present disclosure also provides a data transmission system based on quantum key, comprised of: the sender's device for providing the data to be transmitted; the quantum communication device that has the quantum key distribution device which is deployed on the sender's side to provide data to be transmitted via the sender device; the quantum communication device that has the quantum key distribution device which is deployed on the receiver's side; and the receiver's device that receives the described data to be transmitted.

The quantum key distribution method provided by the present disclosure is improved in its parameter acquisition manner in the privacy amplification phase. There is no longer a need to use the simple classical or alternative channel negotiation manner; instead, an extraction of the parameter information associated with privacy amplification from the initial bit stream is negotiated through quantum channels, thus resulting in both the implementation of the privacy amplification algorithm based on the described parameter information and the obtainment of a shared quantum key. Based on its own principles, the security level of the quantum transmission process and the analysis of error rate in the quantum channel transmission process inform the user if there are eavesdroppers. Such a process thereby eliminates the safety risks present in the privacy amplification parameter negotiation process in classical or alternative channels and effectively improves the security level of the quantum key distribution process.

The privacy amplification method provided by the present disclosure for the quantum key distribution process selects the privacy amplification strategy from the preset privacy amplification strategies group according to certain restrictions. For example, the process uses the obtained initial keys as input to implement the privacy amplification algorithm which corresponds to the selected privacy amplification strategy. Using the above mentioned privacy amplification technique in the quantum key distribution process, the problems of low key production rate caused by using hash algorithms in the privacy amplification phase can be alleviated. Additionally, this technique allows for the selection of various privacy amplification strategies and other differences added by use of a strategy selection mechanism that enable the further implementation of privacy amplification algorithms of different types according to different restrictions. Therefore, it is possible to improve the key production rate while guaranteeing a particular security level.

This summary contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

DESCRIPTION OF THE DRAWINGS

Embodiments of the present disclosure will be better understood from a reading of the following detailed description, taken in conjunction with the accompanying figures in which like reference characters designate like elements and in which.

DETAILED DESCRIPTION

Figure 1:
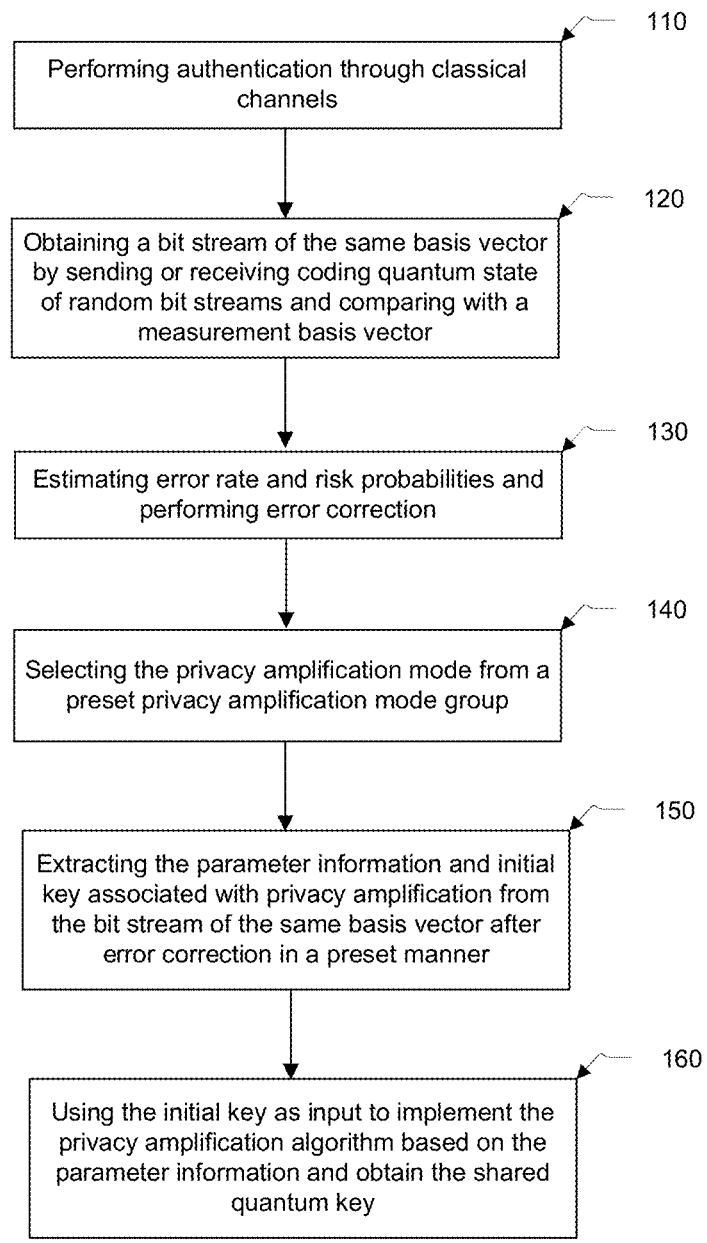
FIG. 1 is a flowchart of a quantum key distribution method in accordance with an embodiment of the present disclosure.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as to avoid unnecessarily obscuring aspects of the various embodiments of the present invention. The drawings showing embodiments of the invention are semi-diagrammatic and not to scale; in particular, some of the dimensions are for clarity of presentation and are shown exaggerated in the drawn Figures. Similarly, although the views in the drawings for the ease of description generally show similar orientations, this depiction in the Figures is arbitrary for the most part. Generally, the invention can be operated in any orientation.

It should be borne in mind, however, that all of these and similar terms are to be associated with the appropriate physical quantities and are merely convenient labels applied to these quantities. Unless specifically stated otherwise, as apparent from the following discussions, it is appreciated that throughout the present invention, discussions utilizing terms such as "processing," "accessing," "executing," "storing," "rendering," or the like refer to the action and processes of a computer system or similar electronic computing apparatus that both manipulates and transforms data represented as physical (electronic) quantities within the computer system's registers, memories, and other computer readable media into other data similarly represented as physical quantities within the computer system's memories, registers, or other such information storage, transmission, or client apparatus. When a component appears in several embodiments, the use of the same reference numeral signifies that the component is the same component illustrated in the original embodiment.

This application provides a quantum key distribution method and apparatus, a privacy amplification method and apparatus for the quantum key distribution process, a data transmission method based on quantum keys, as well as a data transmission system based on quantum keys which are described in detail one-by-one in the following embodiments.

FIG. 1 shows a token of quantum key distribution method 100 by which the present disclosure may be implemented. The method 100 includes the following steps, as detailed below.

Initially, Step 110 performs authentication through classical or alternate channels. The quantum key distribution method provided herein, which is based on existing quantum key distribution protocols, improves the privacy amplification phase of the methodology. The acquisition of the parameter associated with privacy amplification is no longer based on a simple classical or alternative channel negotiation manner, but is instead performed by an extraction from the bit stream as negotiated through a quantum channel, which thereby enhances the security of quantum key distribution processes. Since the ultimate goal of the quantum key distribution process is for the quantum communication apparatus of the sender and receiver to obtain the same securely-shared quantum keys (i.e., shared keys), the quantum key distribution method provided by the present disclosure needs to be implemented in the above described two quantum communication apparatus.

For example, authentication of the other devices that participate in the quantum key distribution process is not performed through the classical or alternative channels until the shared quantum key is generated. This is to ensure that the information transmitted through the classical or alternative channels has not been tampered with by any malicious intermediaries. For the above described process, an embodiment of the present disclosure provides a preferred implementation technique, namely: before starting the quantum key distribution process, the first step of the present process is performed to confirm the identities of each of the communicating parties through a classical or alternative channel, thereby confirming the identities of both the sender and receiver of the light source. Such a confirmation process is performed to prevent man-in-the-middle-attacks (MITM) during the key negotiation process.

Specifically, the sender's quantum communication device sends the authentication and quantum key negotiation request to the receiver's quantum communication device. The receiver's quantum communication device responds to the other's request, verifies the other's identity, and sends its own identity-related information to the sender's quantum communication device. The sender's quantum communication device then uses a similar way to verify the other party's identity. If one party fails to pass the authentication, the subsequent quantum key distribution process will not be initiated, and this process will be terminated.

In a specific example according to an embodiment of the present disclosure, the sender's quantum communication device A presets its own identity to be $UserId_A$, with authorization certificate $Cert_{UserId\_A}$ issued by the authority, and the shared (both the sender's and receiver's quantum communication device) authentication Key $Key_{A\_B}$. The receiver's quantum communication device B presets its identity to be $UserId_B$, with authorization certificate $Cert_{UserId\_B}$ issued by the authority, and the shared authentication key $Key_{A\_B}$, in which the authentication key shared by both parties can be acquired through other trusted ways like text messages, mails, etc. and processed accordingly.

In this step of authentication, the quantum communication device A sends $UserId_A$, $Cert_{UserId\_A}$, and nounce_A, which are encrypted by $Key_{A\_B}$, to the quantum communication device B through classical channels, wherein nounce_A is a random number. After the quantum communication device B receives the above information, it uses $Key_{A\_B}$ to decrypt and verify the legitimacy of $UserId_A$ and $CertUser_{Id\_A}$ through a specific algorithm or uses its stored information of the other device for comparison and then sends $UserId_B$, $Cert_{UserId\_B}$, and nounce_A−1, which are encrypted by $Key_{A\_B}$, to the quantum communication device A through classical channels. The quantum communication device A uses the same manner as described above to decrypt the received information and verify its legitimacy. If after the above mentioned verification process quantum communication devices A and B both determine that the other device is legitimate, the subsequent quantum key distribution process can be started.

In the above example of an embodiment of the present disclosure, a specific example of authentication through classical channels is shown. In other embodiments in accordance with the present disclosure, other authentication methods can be used as long as there can be verification of the legitimacy of the other devices that are going to negotiate the quantum key.

In Step 120 of FIG. 1, a bit stream of the same basis vector is obtained by sending or receiving coding quantum states of random bit streams and comparing those values with a measurement basis vector. The sender's quantum communication device generates a set of binary bit stream randomly, selects basis vectors to prepare corresponding encoding quantum states, and then sends those to the receiver's quantum communication device through a quantum channel. The receiver's quantum communication device then selects a measurement basis vector randomly for measurement after receiving the quantum states. Since there are a variety of polarization states in a single-photon and the basis vector selection processes of the sender and receiver are completely random and independent of each other, the binary bit stream received by the receiver's quantum communication device through the aforementioned process is quite different from that sent by the sender's quantum communication device, known as the "error rate."

To reduce the error rate, both the sender's and the receiver's quantum communications devices need to compare basis vectors to select relevant results. The receiver's quantum communication device makes its own measurement basis vector available through classical channels and the sender's quantum communication device compares its own prepared basis vector with the information disclosed above and discloses the same part of the basis vectors used by both parties. The two parties retain only the binary bit stream of the same basis vector. Through this process, about half of the data is filtered out, leaving a bit stream of the same basis vector described in this application (also referred to as the initial key in prior art).

Step 130 of FIG. 1 estimates the error rate and risk probabilities and also performs the error correction. As an example of this estimation and risk assessment, both the sender's and the receiver's quantum communication apparatuses select and disclose part of the obtained initial keys through classical channels randomly and estimate the error rate of this quantum channel transmission based on the disclosed information. If the error rate is within a preset threshold range, this disclosed part would be removed from the initial binary bit stream and error correction would be performed on the remaining part (i.e., error correction), so that the sender and receiver's quantum communication apparatus obtain the same initial keys. In order to guarantee security (since it is difficult to distinguish error due to the environmental impact caused by detector noise from eavesdropping), if the error rate exceeds the preset threshold value range, the error is generally considered to be caused due to eavesdropping. When the error rate exceeds a preset threshold value range, keys produced by this key distribution process would be given up and an operation of this method would be terminated.

Figure 2:
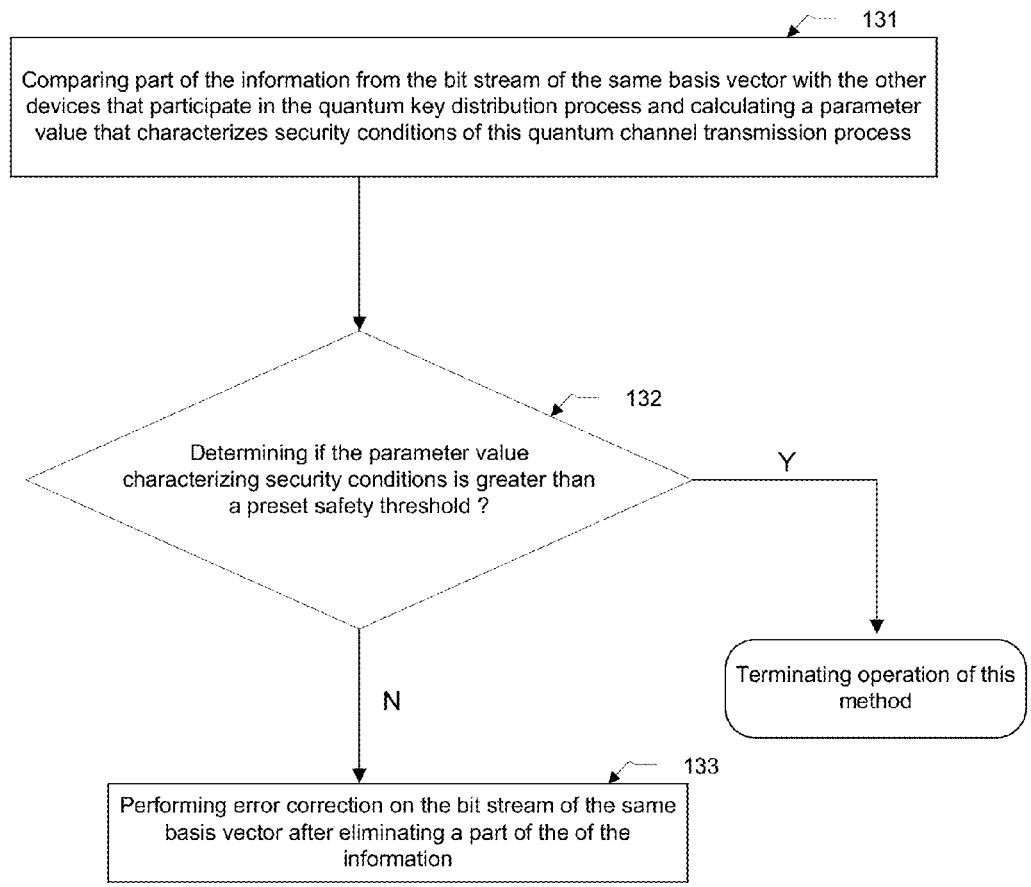
FIG. 2 is a flowchart showing an exemplary process of estimating the error rate and risk probabilities and performing error correction in accordance with an embodiment of the present disclosure.

The embodiments of the present disclosure improve the aforementioned process of determining the error rate by adding a new reference factor in the determination process so that the determination process is more accurate and flexible. This will be explained in more detail from Steps 131 to 133 with reference to FIG. 2.

Step 131 compares part of the information from the bit stream of the same basis vector with the other device that participates in the quantum key distribution process and calculates a parameter value that characterizes security conditions of this quantum channel transmission process.

By publicly comparing part of the information from the bit stream of the same basis vector through classical channels, the parameter value that characterizes security conditions of this quantum channel transmission process can be calculated. The parameter values include the bit error rate and risk probabilities of various attacks in this quantum transmission process wherein the bit error rate is the ratio of the number of inconsistent bits versus the total number of all bits. The risk probabilities of various attacks are the probabilities of various attacks that may exist in the quantum transmission, with the various attacks including strong light blinding attacks, beam-splitting attacks, dead time attacks, etc. On one hand, because the error rates caused by different attacks normally differ in their values, by analyzing the aforementioned error rate, it can be determined whether there is a risk of certain attack. On the other hand, since the number and distribution of the error rates caused by different attacks normally differ in their values, it can also be determined if there is a risk of certain attack; the corresponding risk probability can be estimated by analyzing the error data and log data in the quantum channel transmission process by using data mining technology.

Step 132 determines whether the parameter value characterizing security conditions is greater than a preset safety threshold. If so, operation of this method would be terminated; if not, Step 133 would be performed.

As there is more than one parameter value characterizing security conditions obtained from the embodiment, it is possible to implement different and relatively flexible determination methods according to the needs of specific scenarios. For example, it is possible to get a weighed summation of the obtained bit error rate and various risk probabilities according to the preset weight coefficient and, from there, determine whether the obtained value is greater than a preset safety threshold or determine if any of the described bit error rate and various risk probabilities is greater than the corresponding preset safety threshold value. If the output of the determination is "YES," indicating that the completed quantum channel transmission process is unsafe, this quantum key distribution process would be abandoned and the method would be terminated; otherwise, the process would proceed to Step 133.

Step 133 performs error correction on the bit stream of the same basis vector after eliminating said part of the information. This process is often referred to as data coordination or the error correction process. The quantum communication device of both parties involved in quantum key distribution obtains a consistent set of binary bit stream for the two communicating parties using the classical channel error correction coding technology through public classical channels.

It should be noted that this embodiment uses the bit error rate and risk probabilities of various attacks as a reference to determine if the quantum channel transmission process is safe and provides two determination manners schematically in Step 132. In other implementation manners, it is advisable to obtain or calculate other index values as the basis for determination and use other determination manners to achieve the same technical solution provided by this application.

Step 140 selects the privacy amplification strategy from a preset privacy amplification strategies group. Upon completion of Step 130, parameter information and initial keys associated with privacy amplification can be extracted from the bit stream of the same basis vector after error correction and the privacy amplification algorithm can then be implemented. Considering that existing privacy amplification algorithms are typically implemented by using common hash functions which, in turn, leads to a low quantum key production rate, an embodiment of this application provides another implementation manner that selects the privacy amplification strategy before extracting the privacy amplification parameter and implementing privacy amplification; depending on the specific strategy selected, the parameter is then extracted and the privacy amplification algorithm corresponding to the strategy is implemented. This manner introduces different types of algorithms to the privacy amplification phase to make it possible to improve the quantum key production rates.

In order to achieve the above functions, the quantum communication device for both parties that are involved in the quantum key distribution process can preset the same privacy amplification strategies group as well as rule on how to select the privacy amplification strategy. The described rules are a series of conditions for rule mapping, with the input meeting the specific requirements corresponding to the specific privacy amplification strategy in said privacy amplification strategies group. Each of the privacy amplification strategies corresponds to a particular privacy amplification algorithm, such as the hash algorithm or a key shift algorithm.

The selection of the privacy amplification strategy can be based not only on the error rate and risk probabilities of various attacks calculated in Step 130, but also other reference data for the selection of the privacy amplification strategy (e.g., the security level of the data to be encrypted). Since the security level of the data to be encrypted is generally derived from the application level and associated with a specific business, it is possible to use the parameter negotiation process to obtain this data in the privacy amplification phase.

In a specific example of this embodiment, the quantum communication device located on the side of the sender of the data to be encrypted can learn about the security level of the data from the device that provides the data to be encrypted or, alternatively, from the business application level; the device can then take the initiative to transmit the security level of the data to the receiver's quantum communication device through the classical channel and allow the receiver's quantum communication process to confirm (i.e., complete) the negotiation process. If the sender is not informed of the security level of the data to be transmitted, in order to complete the negotiation process, it is possible for the receiver's quantum communication device to send the recommended security level according to the specific business scenario which is confirmed by the sender's quantum communication device.

After obtaining the security level of the data to be transmitted through the negotiation process, one can follow preset rules to select the corresponding privacy amplification strategy using the error rate, risk probabilities of various attacks, and said security level obtained in Step 130 as input. In the case of sensitive data that requires a relatively high security level, for example, one can select a privacy amplification strategy based on hash algorithm; for general data that requires a relatively lower security level—even if the estimated error rate or risk probabilities are relatively high— one does not have to choose a privacy amplification strategy based on hash algorithm; a privacy amplification strategy based on shift algorithm can instead be selected.

The above selection of strategy is actually a process of comprehensive consideration and weighed selection based on the error rate, risk probabilities, and the security level of data. While the safety level of hash functions is usually relatively high, because hash functions are essentially a kind of compressed mapping, the length of the shared key produced by using hash functions as a means to implement privacy amplification is usually much smaller than the length of the initial key used as the input for the hash function. This results in a relatively low key production rate. Although its security level is not as high as hash functions, shift algorithm, by comparison, does not have much length loss for the produced shared key, so it is possible to obtain a relatively high key production rate. The aforementioned preferred implementation manner through the strategy selection process can not only improve the quantum key production rate when providing the corresponding security level, but also flexibly balance the key production rate and the security level of quantum key distribution.

This embodiment uses the bit error rate, risk probabilities, and the security level of the data to be encrypted as input conditions for selecting the privacy amplification strategy. In other implementation methods, it is also possible to employ other combinations of each of the above described input conditions (e.g., using error rate and the security level of the data to be encrypted as the input conditions for selecting the privacy amplification strategy). This embodiment exemplifies privacy amplification strategies based on hash functions and shift algorithm. In other implementation methods, however, it is advisable to implement other privacy amplification strategies, such as a privacy amplification strategy based on compression algorithm. One can also choose other business characteristics associated with the data to be encrypted (besides the security level) as the input conditions for selecting privacy amplification strategies as long as the privacy amplification strategy selected corresponds to the specific input condition and balances the key production rate and the security level of the quantum key distribution to a certain degree.

Following a preset manner, Step 150 extracts the parameter information and initial key associated with the privacy amplification phase from said bit stream of the same basis vector after error correction.

After error correction, the sender's and receiver's quantum communication devices have shared the same set of bit stream. However, it is still possible that eavesdroppers can obtain part of the shared information in the previous phases (e.g., the quantum transmission and error correction phases). In order to minimize the amount of information obtained by an eavesdropper, privacy amplification algorithms are usually needed. By implementing privacy amplification algorithms, it is possible to minimize the information obtained by the eavesdropper from the above bit stream so that both the sender's and the receiver's quantum communication devices can share a set of unconditionally secure keys.

Before the implementation of privacy amplification algorithms, it is first necessary to obtain parameter information associated with the implementation of the privacy amplification algorithm. Only if the parameter information is determined can the specific algorithm be implemented. The quantum key distribution method provided herein does not use the conventional manner of acquiring parameters simply by negotiation through the classical channel, but instead extracts the parameter information associated with privacy amplification from the bit stream negotiated through quantum channels, thereby increasing the security level of the quantum key distribution process. Specifically, it extracts a partial bit stream as the parameter information associated with privacy amplification in a prescribed manner from the same base vector bit stream after error correction and then uses the remaining bit stream as the initial keys (the initial keys being the input for the subsequent implementation of privacy amplification). It is also possible to use the bit stream of the same basis vector after error correction as the initial keys and to extract a partial bit stream as the parameter information associated with privacy amplification in a preset manner from the initial keys. For example, the first 2,048 bits may be used as the parameter information and the remaining bits as the initial keys.

Subsequently, in the preset manner, each specific parameter associated with the implementation of the privacy amplification algorithm is extracted from the parameter information. If the previous step selects the privacy amplification strategy by the preferred implementation method as described in Step 140, the specific parameter corresponding to the selected privacy amplification strategy can be extracted from the above described parameter information.

If the selected privacy amplification strategy is the privacy amplification strategy based on hash algorithm, specific parameters that can be extracted include: key length, the number of binary bits per each hash function coefficient, the interception position from initial keys, and the hash function serial number. Normally the same hash function libraries are preset in the sender's and receiver's quantum communication devices that participate in the quantum key distribution process, so the hash function serial number can be used to uniquely identify the hash function in the library. In this specific implementation, it is advisable to instead use the hash function degree (i.e., the highest index of x in the polynomial) and hash function coefficients in lieu of the hash function serial number to uniquely identify hash functions. In this case, it is necessary to extract the hash function degree and hash function coefficients correspondingly from the above parameter information.

If the selected privacy amplification strategy is the privacy amplification strategy based on shift algorithm, said parameter information corresponding to the privacy amplification strategy includes the key length and key shift algorithm serial number; alternatively, if the algorithm serial number is not used to uniquely identify the shift algorithm, the two specific parameters of key shift direction and shift number can be extracted from the above parameter information. The above extraction process of the initial key and parameter information should be implemented in the preset manner by the quantum communication device of both parties that participates in the quantum key distribution process in order to ensure that both parties obtain the same initial key and parameter. In the specific implementation, it is advisable to preset the manner of extracting the information mentioned above in the quantum communication device of both parties and perform extraction each time according to the preset manner. Alternatively, dynamic negotiation may be utilized, in which the quantum communication device of both parties negotiates the specific manner of extracting the information through classical channels.

It should be noted that this embodiment describes the implementation manner for extracting the parameter information associated with privacy amplification from the bit stream negotiated by the quantum channels. In other implementation manners, it is advisable to extract some parameters associated with privacy amplification from the bit stream negotiated by the quantum channel and others through the negotiation by the classical channel according to the conventional manner in prior art; for example, it is advisable to negotiate such parameters as key length through classical channels as this method can still achieve the technical goal of improving the security of key distribution because part of the parameter is obtained from the quantum channel. Whether it is all of the parameters or only some of the parameters that are extracted from the bit stream negotiated by the quantum channel is not of concern; rather, it is merely the change in the specific implementation manner—without departing from the core of the application—that matters and is, therefore, within the scope of this application.

Step 160 uses the initial key as input to implement the privacy amplification algorithm based on the parameter information and obtain the shared quantum key. In order to ensure that the quantum communication device of both parties involved in the quantum key distribution process can eventually obtain the same shared quantum key, the two parties can perform the handshake confirmation process before the implementation of the specific privacy amplification algorithm. Specifically, through classical channels, the information that describes the currently selected amplification privacy strategy is sent to the other party's quantum communication device, waiting for its confirmation; alternatively, the information describing the privacy amplification strategy sent by the other party's quantum communication device is compared with the privacy amplification strategy selected locally and a confirmation message is sent to the other device. To further enhance security, it is also advisable to use anonymous transmission, namely: rather than transmitting the specific description of the privacy amplification strategy, instead transmit the selected privacy amplification strategy in the form of the pre-agreed digital coding format. In this process, the above manner can also be used to confirm the specific extracted parameter information.

If the two parties successfully shake hands, it is permissible to begin to implement the specific privacy amplification algorithm to obtain a shared quantum key; if unsuccessful, the strategy should be reselected or the two parties should reach an agreement through negotiation or abandon this quantum key distribution process. In the specific implementation process, the aforementioned handshake confirmation process is optional and its implementation can be determined according to the specific need.

Figure 3:
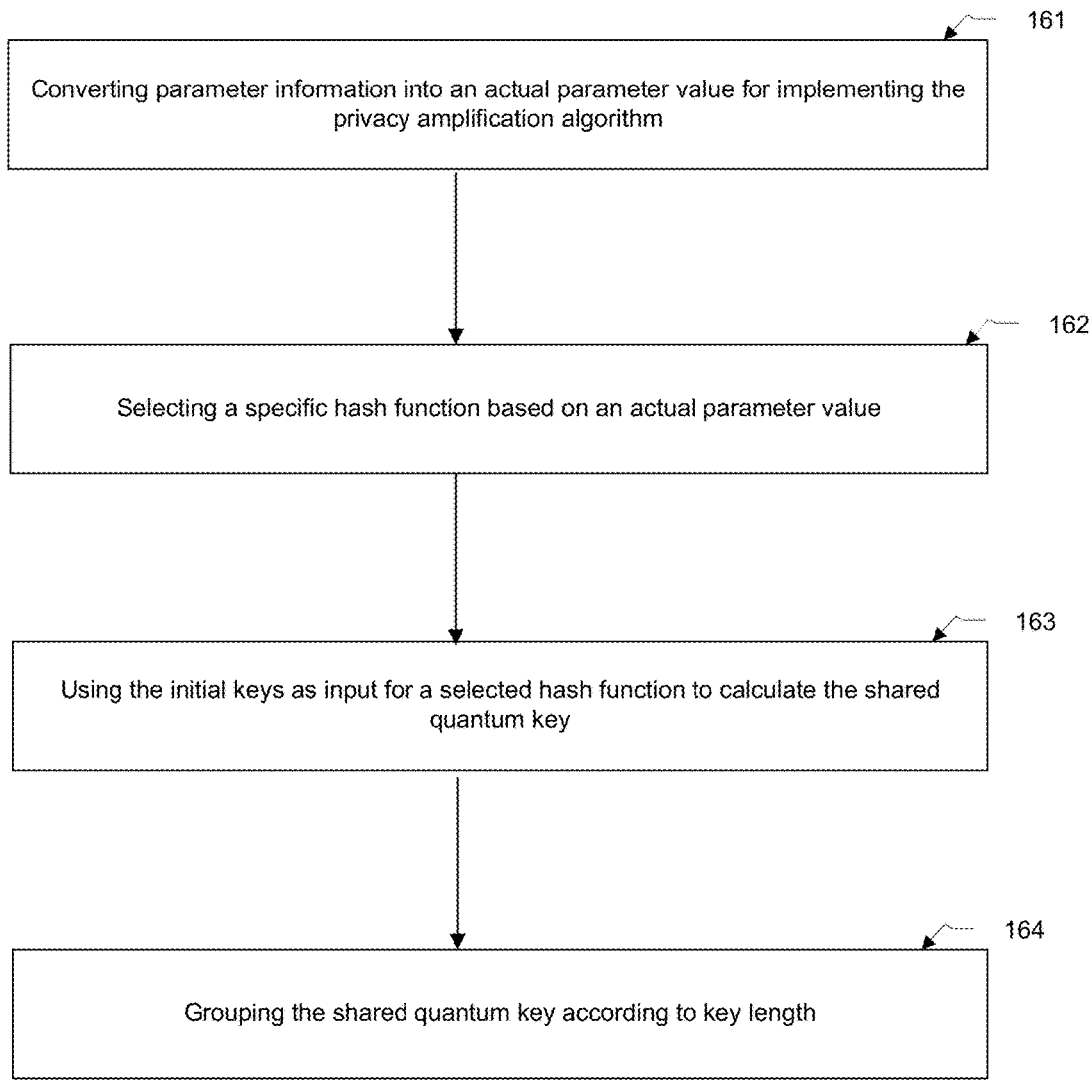
FIG. 3 is a flowchart showing an exemplary process of implementing the privacy amplification algorithm in accordance with an embodiment of the present disclosure.

At this point, since the initial keys and the parameter information associated with privacy amplification have been obtained, it is advisable to implement the privacy amplification algorithm corresponding to the currently selected privacy amplification strategy based on said parameter information. The privacy amplification strategy based on hash algorithm will be used as an example to further explain the implementation of this process with reference to FIG. 3. The process comprises Steps 161 to 164.

Step 161 converts parameter information into an actual parameter value for implementing the privacy amplification algorithm. Since what is transmitted through the quantum channel is a random binary bit stream, the value range of the parameter extracted from this bit stream may differ from the value range of the actual parameter for implementing the privacy amplification algorithm. Also, if an anonymous manner is used for parameter negotiation through the classical channel (i.e., what are transmitted in the classical channel are digitally encoded parameters), it is necessary to convert these parameters according to a preset manner in this step through such means as, for example: mapping a certain parameter value extracted from the bit stream into an actual parameter value that can be used for implementing the privacy amplification algorithm (e.g., use of modulo) and converting the digitally encoded parameter into the actual value corresponding to this code.

If the parameters extracted from the quantum states can be directly used to implement the privacy amplification algorithm or anonymous manner is not used when negotiating some parameters in classical channels, operation in this step is not necessary and the value of the specific parameter already obtained is the actual parameter value that can then be used for the privacy amplification algorithm. Actual parameter values will be used in Steps 162 to 164 and will not be specified one by one.

Step 162 selects a specific hash function based on the actual parameter value. Specifically, according to the hash function serial number, the corresponding generic hash function is selected from the preset hash function library. Alternatively, based on the hash function degree and hash function coefficients, the specific generic hash function is determined.

Step 163 uses the initial keys as input for the selected hash function to calculate the shared quantum key. In the interest of explanation, the parameter representing the interception position from the initial keys will be denoted by p and the parameter representing the number of binary bits per hash function coefficient will be denoted by m. This step is for the selected generic hash function in which a binary bit string of a certain length is intercepted from the initial key's p-th bit and grouped in accordance with m. The bit string in each group is converted into corresponding decimal numbers, and the string formed by the converted decimal number is used as an input to implement the selected generic hash function to calculate the final shared quantum key of both sides.

Step 164 groups the shared quantum key according to the key length. Upon completion of Step 163, the quantum communication devices of both sides involved in the quantum key distribution process will have obtained the shared quantum key. In the specific embodiment according to the present disclosure, the length of this shared quantum key is normally greater than the length of the actual key to be used. This step groups the shared quantum key according to the obtained key length parameter to obtain a multiset of keys. Depending on the application requirements, the multiset of keys can be provided to a data transmission device to transmit data. One can also select the key group from multikey groups in a preset manner, encrypt the data to be transmitted, or decrypt the received encrypted data using the corresponding key group.

If the selected privacy amplification strategy is based on shift algorithm, the process of the implementation of the specific privacy amplification algorithm is similar to the above process insofar as actual parameter values are generated to determine the specific shift algorithm. Corresponding shift operation is then performed on the initial key based on the shift direction and shift number of this shift algorithm and the initial keys are grouped based on the key length. Alternatively, the initial keys are grouped based on the key length, and the specific shift operation is performed on each group based on the shift direction and the number of shifts.

Details of the quantum key distribution method provided by this application are described above. In specific applications, not every step discussed above is necessary. For example, authenticating the sending and receiving ends of the light source before initiating the quantum key distribution process is to further improve the security of this technical solution; for another example, estimating risk probabilities, negotiating the security level of the data to be encrypted, and selecting the privacy amplification strategy are performed to implement different privacy amplification algorithms to improve the code production rate. In specific applications, it is not necessary to perform each step or operation related to the above descriptions. As long as the parameter information or part of the parameter information associated with the privacy amplification is obtained from the bit stream negotiated by the quantum channel, the goal of improving the security of the quantum key distribution process can be achieved, thereby realizing the beneficial effects of the technical solution provided by this application.

Figure 4:
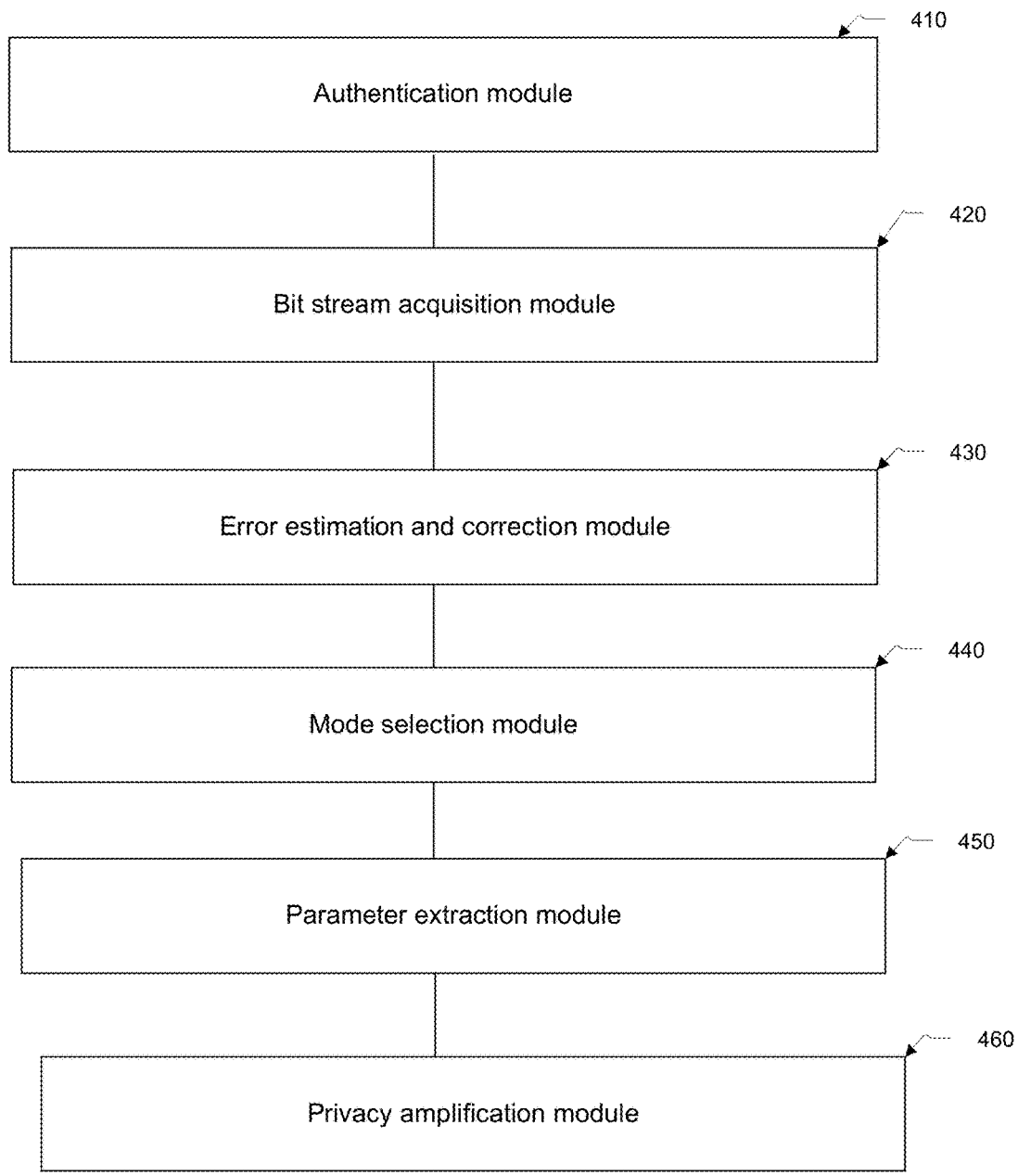
FIG. 4 is a schematic diagram of a quantum key distribution apparatus in accordance with an embodiment of the present disclosure.

In summary, the quantum key distribution method provided herein improves the parameter acquisition method in the privacy amplification phase. Though it no longer uses the simple classical channel negotiation manner, it can extract the parameter information associated with privacy amplification from the bit stream originally negotiated by the quantum channel and implement the privacy amplification algorithm based on the described parameter information to obtain the shared quantum key. Since the quantum transmission process has a high security level based on its own principles, it is possible to discover the presence of eavesdroppers by analyzing the error rate in the quantum channel transmission process. This eliminates the security risks present in the process of negotiating privacy amplification parameters in the classical channel and thus can effectively improve the security of the quantum key distribution process. The embodiment described above provides a quantum key distribution method. Correspondingly, this application provides a quantum key distribution device. FIG. 4 is the schematic diagram of an embodiment of a quantum key distribution device of this application. As the device embodiment is substantially similar to the method embodiment, the provided description is relatively simple. Please refer to the relevant instructional portion of the method embodiment. The following description of the device embodiment is purely illustrative. A quantum key distribution device 400 of this embodiment includes an authentication module 410 to be used for authenticating the other participating device in the quantum key distribution process through a classical channel. If the other device does not pass the authentication, then implementation of this method would be terminated. The quantum key distribution device 400 also includes a bit stream acquisition module 420 for obtaining a bit stream of the same basis vector by sending or receiving the coding quantum states of random bit streams and comparing with measurement basis vectors; an error estimation and correction module 430 for estimating the error rate and risk probabilities in this quantum channel transmission process and performing error correction; a strategy selection module 440 for selecting the privacy amplification strategy from a preset privacy amplification strategies group; a parameter extraction module 450 for extracting parameter information associated with privacy amplification and initial keys from the bit stream of the same base vector after error correction in a preset manner; a privacy amplification module 460 for using said initial keys as input to implement the privacy amplification algorithm and obtain the shared quantum key based on the parameter information.

In some embodiments of the present disclosure, the error estimation and correction module further includes a security parameter calculation submodule for comparing part of the information of the bit stream of the same basis vector with the other device that participates in the key distribution process before triggering operation of the parameter extraction module. Additionally, the security parameter calculation submodule calculates the parameter value characterizing security conditions of this quantum channel transmission. The error estimation and correction module also includes a threshold value determination submodule for determining whether the parameter value characterizing security conditions output by the security parameter calculation submodule is greater than a preset safety threshold value. When the output of the threshold determination submodule is "YES," an implementation termination submodule of the error estimation and correction module for terminating operation of this device is used; conversely, when the output from the threshold determination module is "NO," an error correction submodule of the error estimation and correction module is used to perform error correction on the bit stream of the same basis vector where the part of the information for comparison is eliminated.

The parameter value characterizing security conditions of this quantum channel transmission process, as calculated by the security parameter calculation submodule of the error estimation and correction module, includes the bit error rate and risk probabilities of various possible attacks in the quantum channel transmission process.

The threshold value determination submodule is used to determine if weighted summation of the bit error rate and risk probabilities is greater than a preset safety threshold or, alternatively, to determine if any of the described bit error rate and risk probabilities is greater than the preset corresponding safety threshold value.

In some embodiments of the present disclosure, the described strategy selection module comprises a strategy parameter negotiation submodule for negotiating the reference data used to select the privacy amplification strategy with the other party through classical channels before triggering operation of the parameter extraction module; a strategy selection implementation submodule for selecting the privacy amplification strategy from a preset privacy amplification strategies group according to the bit error rate and risk probabilities output by the security parameter calculation submodule and the parameter data output by the strategy parameter negotiation submodule is also utilized.

Accordingly, the parameter extraction module is specifically used to extract parameter information and initial keys corresponding to said privacy amplification strategy from the aforementioned bit stream of the same basis vector.

Accordingly, the privacy amplification module is specifically used to implement the privacy amplification algorithm corresponding to the privacy amplification strategy based on the parameter information.

Additionally, the privacy amplification strategy selected by the strategy selection module includes either the privacy amplification strategy based on hash algorithm or the privacy amplification strategy based on shift algorithm. When the strategy selection module selects the privacy amplification strategy based on hash algorithm, the parameter information extracted by the parameter extraction module includes the following: key length, the number of binary bits per hash function coefficient, the interception position from the initial keys, as well as the hash function serial number or hash function degree and coefficients. However, when the strategy selection module selects the privacy amplification strategy based on shift algorithm, the parameter information extracted by the parameter extraction module includes the key length and the key shift algorithm number or the key shift direction and shift number.

In some embodiments of the present disclosure, when the strategy selection module selects the privacy amplification strategy based on hash algorithm, the privacy amplification module includes an actual parameter conversion submodule for converting the parameter information into an actual parameter value for implementing the privacy amplification algorithm according to a preset manner. A hash function selection submodule for selecting the corresponding hash function based on the following actual parameter values also includes: the hash function number or the hash function degree and coefficients; a shared key generation submodule for generating a string from the initial key based on the number of binary bits per hash function coefficient and the interception position from initial keys, with the string being used as input for the hash function to calculate the shared quantum key; and a shared key grouping submodule for grouping said shared quantum keys based on key length.

In some embodiments of the present disclosure, the device also comprises a strategy confirmation module for confirming the selected privacy amplification strategy with the other device that participates in the quantum key distribution process through a classical channel before triggering operation of the privacy amplification module.

Optionally, the strategy confirmation module is specifically used to confirm the selected privacy amplification strategy using a pre-agreed digitally encoded format with the other device that participates in the quantum key distribution process through classical channels.

Figure 5:
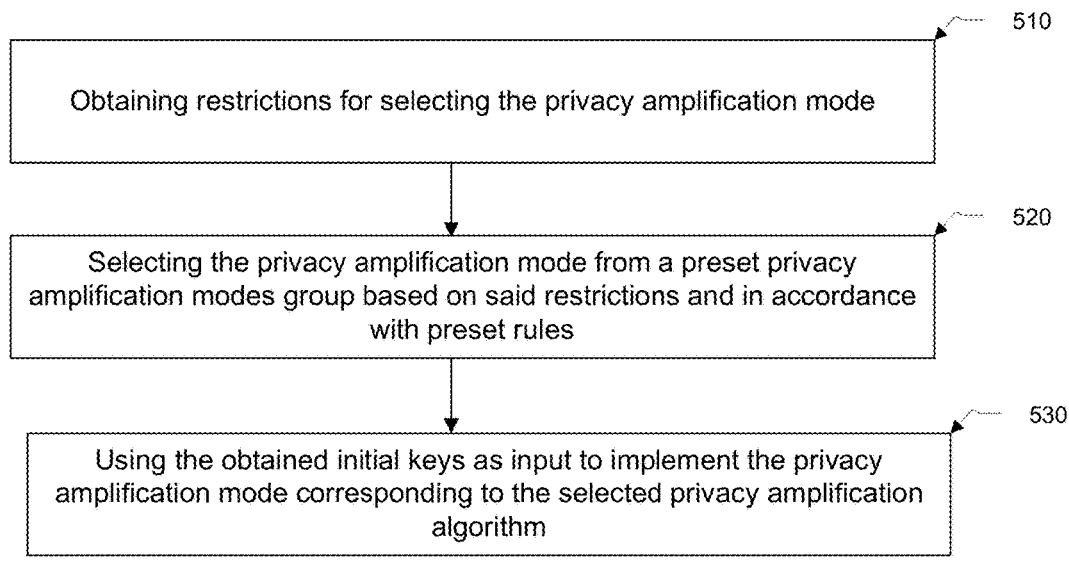
FIG. 5 is a flowchart of a privacy amplification method for the quantum key distribution process in accordance with an embodiment of the present disclosure.

Corresponding to the above quantum key distribution method, this application also provides a privacy amplification method for the quantum key distribution process. FIG. 5 is a flowchart of an embodiment of a privacy amplification method for the quantum key distribution process of the present disclosure. As with the previous embodiment, the same part in this embodiment will not be described again; instead, further descriptions will focus on the differences. The privacy amplification method for the quantum key distribution process provided by the present disclosure includes the following steps, as detailed below.

Step 510 obtains restrictions for selecting the privacy amplification strategy. Existing privacy amplification methods are typically based on single hash functions. Although the security level is high, the key production rate is low. The privacy amplification method for the quantum key distribution process provided by this application selects different privacy amplification strategies according to different restrictions. Different privacy amplification strategies correspond to different privacy amplification algorithms (e.g., hash algorithm or shift algorithm), thereby improving the key production rate while still meeting certain security requirements.

In order to achieve the above functionality, the same privacy amplification strategies groups as well as the rules for selecting privacy amplification strategies from the described groups based on the restrictions can be preset in the quantum communication devices that participate in the quantum distribution process. Upon implementation of this step to obtain the restrictions, the corresponding privacy amplification strategy can be selected according to preset rules.

Restrictions for selecting the privacy amplification strategy comprise at least one of the following elements: the error rate of the quantum channel transmission process, risk probabilities of various possible attacks in the quantum channel transmission process, and reference data associated with the data to be encrypted. A brief description is provided to explain how to obtain the above described restrictions, as follows:

(1) Error rate. The quantum communication device of the two parties involved in the quantum key negotiation process first transmits the coding quantum states of random bit streams through a quantum channel. The bit streams are filtered by comparing the measurement basis vector, then selecting part of the filtered bit stream for disclosure, and estimating the error rate of this quantum channel transmission based on disclosed information (i.e., bit error rate).

(2) Risk probabilities of various possible attacks. After the above-described error rate estimation, risk probabilities of various attacks are obtained through analyzing the error rate value, error distribution pattern, and monitoring log data of the quantum channel transmission process. From there, it can be determined whether there exists a risk of being attacked and the corresponding risk probability can be estimated.

(3) Reference data associated with the data to be encrypted. The described reference data associated with the data to be encrypted comprises the security level of the data to be encrypted as well as other relevant reference data associated with the data to be encrypted. The reference data is usually associated with the specific business and can be obtained through negotiation between the quantum communication devices of the two sides that participate in the quantum key distribution process through the classical channel before selecting the privacy amplification strategy. For example, the data can be obtained during the process of parameter negotiation in the privacy amplification phase.

Three restrictions obtained by the present embodiment are listed above. In a specific implementation process, it is advisable to select a certain restriction or a combination of two or more restrictions from them according to the specific need. It is also acceptable to select other restrictions different from the aforementioned restrictions, which this application would not limit.

Step 520 selects the privacy amplification strategy from the preset privacy amplification strategies group based on said restrictions and in accordance with preset rules. The privacy amplification strategy includes either the privacy amplification strategy based on hash algorithm or the privacy amplification strategy based on shift algorithm. Additionally, this step selects the corresponding privacy amplification strategy based on the restrictions obtained in the above described Step 510, in accordance with the preset rules on how to select the privacy amplification strategy. For example, for sensitive data requiring a relatively high level of security, one can choose the privacy amplification strategy based on hash algorithm; alternatively, for general data requiring a relatively low level of security, even if the estimated error rate or risk probabilities are relatively high, it is advisable to instead select the privacy amplification strategy based on shift algorithm. Such a selection based on shift algorithm can improve the quantum key production rate when it is necessary to meet the security requirement of the corresponding data. Although the privacy amplification strategies based on hash algorithm and shift algorithm are listed above, other implementation techniques according to the present embodiment are not limited to the two above-described privacy amplification strategies; other privacy amplification strategies can also be used (e.g. a privacy amplification strategy based on a data compression algorithm).

Step 530 uses the initial keys obtained as input to implement the privacy amplification algorithm corresponding to the selected privacy amplification strategy. The initial key is obtained from the bit stream of the same basis vector after error correction. Instructions for this part can be found in the instructions of the embodiment according to FIG. 1 of the present disclosure and, therefore, will not be repeated here.

In order to implement the privacy amplification algorithm corresponding to the selected privacy amplification strategy, the parameter information corresponding to the privacy amplification strategy must first be obtained, and the specific privacy amplification algorithm based on the parameter information must then be determined. Here, the parameter information may be acquired by either one of the following two ways or some combination thereof: 1) First, in accordance with the way agreed upon in advance, an extraction of the described parameter information from the bit stream of the same basis vector after error correction is performed; 2) Next, through a classical channel, a negotiation of the parameter information with the other device that participates in the quantum key distribution process is performed. For different privacy amplification strategies, the obtained parameter information differs. Instructions on this part are obtained in the same manner as those detailed in FIG. 1 of an embodiment according to the present disclosure and, therefore, will not be repeated here. After obtaining the parameter information corresponding to the selected privacy amplification strategy, the specific privacy amplification algorithm corresponding to the privacy amplification strategy can be determined. Using the initial set of keys as input, the specific amplification algorithm is then implemented to obtain the final shared quantum key.

Privacy amplification, according to an embodiment of the present disclosure, alleviates issues associated with a low key production rate caused by hash algorithm. For example, in such methods, different privacy amplification strategies can be selected based on different restrictions with the inclusion of an extra step involving the addition of strategy selection mechanisms and the further implementation of different privacy amplification algorithms. Using this method, it is possible to improve the key production rate as well as certain security requirements.

Figure 6:
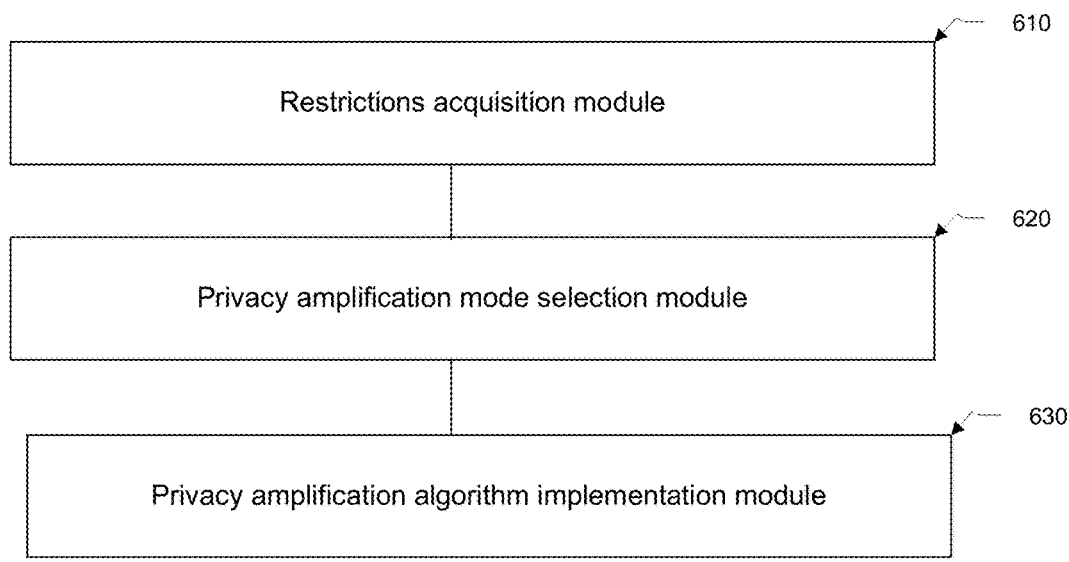
FIG. 6 is a schematic diagram of a privacy amplification apparatus for the quantum key distribution process in accordance with an embodiment of the present disclosure.

FIG. 6 is a schematic diagram of an embodiment of a privacy amplification device for the quantum key distribution process of this application. Since the device embodiment is substantially similar to the method embodiment, only the relevant description is provided here.

The privacy amplification device for the quantum key distribution process provided by an embodiment of the present disclosure comprises the following modules: a restrictions acquisition module 610 for obtaining restrictions for selecting privacy amplification strategies; a privacy amplification strategy selection module 620 for selecting the privacy amplification strategy from the preset privacy amplification strategies group based on the restrictions; and a privacy amplification algorithm implementation module 630 for implementing the privacy amplification algorithm corresponding to the selected privacy amplification strategy, using the obtained initial key as input.

Additionally, before obtaining the restrictions corresponding to the selected privacy amplification strategy, the initial key used by the privacy amplification algorithm implementation module is extracted from the bit stream of the same basis vector; the bit stream of the same basis vector is acquired by sending or receiving coding quantum states of random bit streams, comparing those with the measurement basis vectors, and, finally, performing an error correction procedure as described above.

Also, restrictions for selecting the privacy amplification strategy obtained by the restrictions acquisition module include at least one of the following elements: the error rate of the quantum channel transmission process, risk probabilities of various possible attacks in the quantum channel transmission process, and/or reference data associated with the data to be encrypted.

According to some embodiments of the present disclosure reference data associated with the data to be encrypted obtained by the restrictions acquisition unit comprises the security level of the data to be encrypted.

According to some embodiments of the present disclosure, this reference data, which is associated with the data to be encrypted and acquired by said restriction acquisition unit, is obtained through negotiation with the other device that participates in the quantum key distribution process through a classical channel.

According to some embodiments of the present disclosure, risk probabilities of various attacks are obtained from the restrictions acquisition unit by analyzing error information during the quantum channel transmission process.

According to some embodiments of the present disclosure the device further comprises a privacy amplification parameter acquisition module for obtaining parameter information corresponding to the strategy selected by the privacy amplification selection module before triggering operation of the privacy amplification algorithm implementation module.

Accordingly, the privacy amplification algorithm implementation module includes a privacy amplification algorithm selection submodule for determining the specific privacy amplification algorithm corresponding to the selected privacy amplification strategy based on the obtained parameter information and a privacy amplification algorithm implementation submodule uses the initial keys as input to implement the specific privacy amplification module based on the parameter information.

According to some embodiments of the present disclosure, the privacy amplification parameter acquisition module is used to extract the parameter information corresponding to the selected privacy amplification strategy from said bit stream of the same basis vector after error correction, in accordance with the pre-agreement; and/or through classical channels to negotiate the parameter information corresponding to the selected privacy amplification strategy with the other device that participates in the quantum key distribution process.

Figure 7:
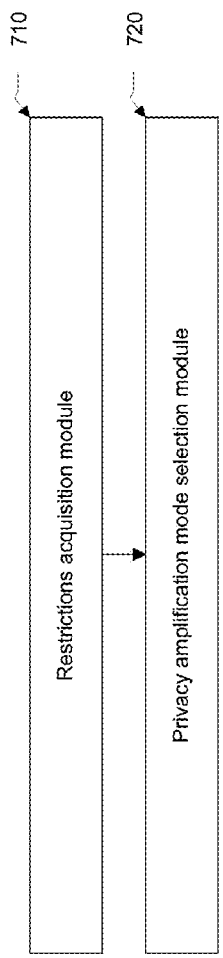
FIG. 7 is a flowchart of a data transmission method based on quantum keys in accordance with an embodiment of the present disclosure.

Furthermore, according to some embodiments of the present disclosure, a data transmission method based on quantum keys is provided. FIG. 7 is a flowchart of an embodiment of a data transmission method based on quantum key provided by this application. The same instructions of this embodiment—as with the first embodiment—will not be repeated. The following descriptions will focus on the differences. The data transmission method based on quantum key comprises Step 710, in which the sender uses a shared quantum key to encrypt the data to be transmitted and then sends the encrypted data to the receiver, and Step 720, in which the receiver uses the same shared quantum key to decrypt the received data. Using the quantum key distribution method provided by this application, the shared quantum key used by both the sender and receiver is obtained by the sender's and receiver's quantum communication devices in the same trusted network as the sender and receiver respectively.

Figure 8:
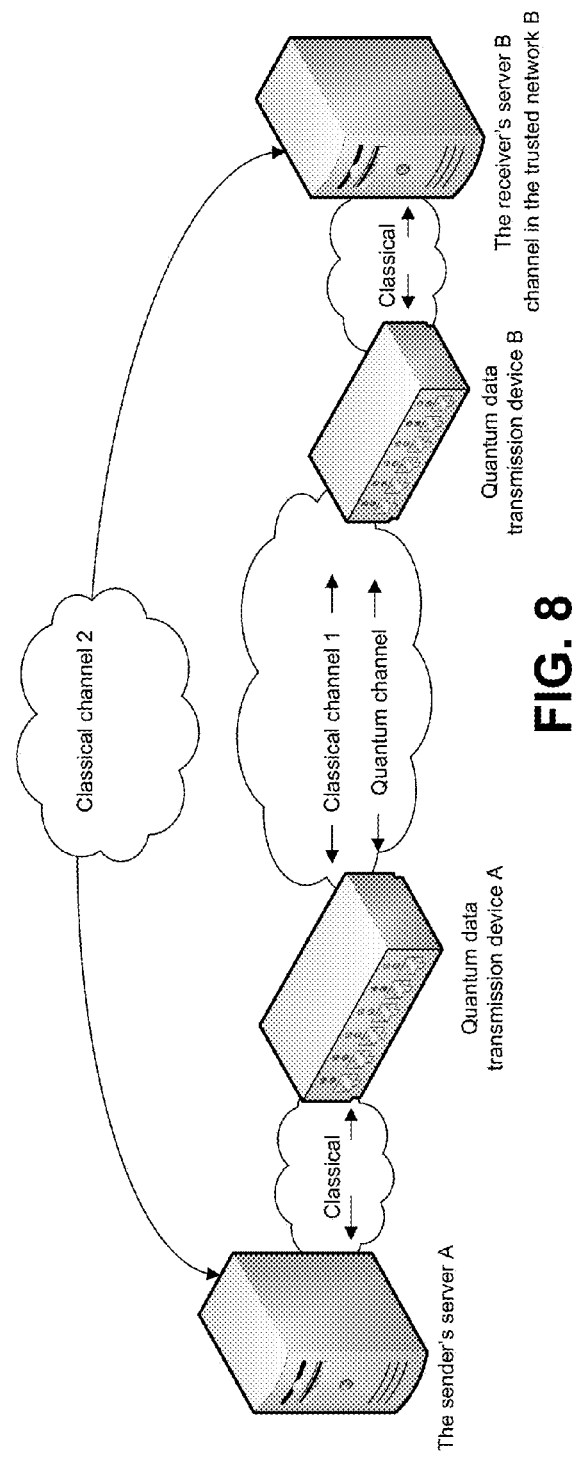
FIG. 8 is a schematic diagram of a data transmission method based on quantum keys in accordance with an embodiment of the present disclosure.

In specific applications, the above-described data transmission process can be performed in two different ways: transmitting data through the classical channel between the sender's quantum communication device and the receiver's quantum communication device or, alternatively, transmitting data through the classical channel between the sender and the receiver. Steps 510 and 520 are further illustrated below based on the aforementioned method with reference to FIG. 8.

(A), Data Transmission Through the Classical Channel Between Quantum Devices.

In Step 501, server A of the sender sends the data to be transmitted to the sender's quantum communication device A. The sender's quantum communication device A uses the key selected from the shared quantum keys to encrypt the data to be transmitted, and the encrypted data is sent to said receiver's quantum communication device B through classical channel 1.

In Step 502, the receiver's quantum communication device B uses the same manner as the sender's quantum communication device A to select the corresponding key from the shared quantum keys and decrypt the received data. The receiver's quantum communication device B then sends the decrypted data to server B of the receiver.

To further enhance security, before sending the data to be transmitted to quantum communication device A of the sender, server A of the sender first uses a classical encryption algorithm to encrypt the data to be transmitted and then performs the transmission operation. Server B of the receiver uses the decryption algorithm corresponding to the classical encryption algorithm to decrypt the data forwarded by the quantum communication device of the receiver.

(B) Data Transmission Through the Classical Channel Between the Sender and Receiver.

In Step 501, server A of the sender extracts the key from the shared quantum keys provided by the quantum communication device A of the sender and uses said key to encrypt the data to be transmitted. Then, server A of the sender sends the encrypted data to server B of the receiver directly through classical channel 2.

In Step 502, server B of the receiver uses the same manner as server A of the sender to extract the corresponding key from the shared quantum keys provided by quantum communication device B of the receiver. Server B of the receiver uses the described corresponding key to decrypt the received data.

As the shared key produced by the quantum key distribution method provided by the present disclosure is used for both data encryption and decryption, in specific applications—regardless of what kind of data transmission methods is used—the security of the data transmission process can be effectively guaranteed.

Figure 9:
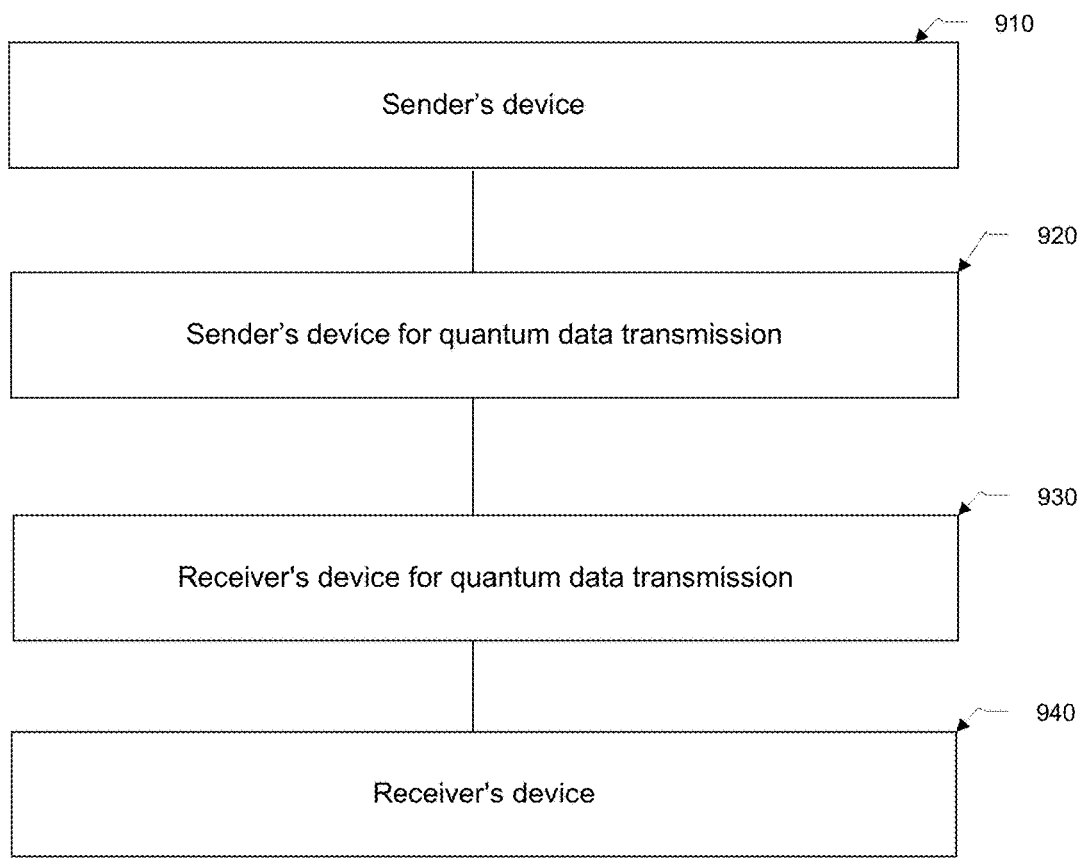
FIG. 9 is a schematic diagram of a data transmission system based on quantum keys in accordance with an embodiment of the present disclosure.

The above embodiment provides a data transmission method based on quantum key. Correspondingly, this embodiment also provides a data transmission system based on quantum key. As shown in FIG. 9, the system includes the sender's device 910 for providing the data to be transmitted, the quantum communication device 920 with the quantum key distribution device deployed on the sender's side, the quantum communication device 930 with the quantum key distribution device deployed on the receiver's side, and the receiver's device 940 for receiving the described data to be transmitted.

Both the quantum communication device deployed on the sender's side and the described quantum communication device deployed on the receiver's side use the key distribution method provided by the present disclosure to obtain the shared quantum key through their respective key distribution device. The aforementioned key distribution method is also used to encrypt or decrypt the data transmitted between these two quantum devices using the described shared key or to provide the shared key to the corresponding sender's or receiver's device for them to use the described key to then encrypt or decrypt data.

Although this application discloses such embodiments as above, they are not intended to limit this application. Any technician skilled in the art, without departing from the spirit and scope of this application, can make possible changes and modifications. The protected scope of this application, therefore, should be defined as the requested scope by the claims of this application.

In a typical configuration, the computing device includes one or more processors (CPU), input/output ports, network ports, and memory. Memory may include volatile memory of a computer-readable medium, random access memory (RAM), and/or other forms of nonvolatile memory, such as read-only memory (ROM) or flash memory (flash RAM) and is an example of computer-readable media.

Computer-readable media also includes permanent and non-permanent as well as removable and non-removable media. Information storage may be achieved by any method or technique. Information may be computer-readable instruction, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, CD-ROM read-only memory (CD-ROM), digital versatile disks (DVD) or other optical storage, magnetic tape cassette, magnetic disk storage or other magnetic tape storage device, or any other non-transmission medium that may be used to store information that can be accessed by computing. According to the definition herein, computer-readable media does not include non-temporary storage computer-readable medium (i.e., transitory media) such as modulated data signal and carrier wave.

Technicians skilled in the art should understand that embodiments of this application may be method, system, or computer program products. Accordingly, this application may use entirely hardware embodiments, entirely software embodiments, or embodiments of a combination of both hardware and software forms.

What is claimed is:

1. A method of quantum key distribution, the method comprising:
   receiving a plurality of quantum states from a quantum channel;
   extracting a binary bit stream from the plurality of quantum states;
   modifying the binary bit stream to form a modified bit stream;
   determining a required level of security;
   determining a privacy amplification algorithm based on the required level of security;
   extracting an initial key and a number of parameter values of a corresponding number of algorithm parameters required by the privacy amplification algorithm from the modified bit stream, the number of privacy amplification parameters being transmitted in an anonymous way; and
   executing the privacy amplification algorithm based on the initial key and the parameter values to obtain a shared key.

2. The method of claim 1, further comprising wherein extracting the binary bit stream from the plurality of quantum states includes:
   generating a string of receiver random bases;
   measuring the plurality of quantum states with the string of receiver random bases to generate a string of measured bits that corresponds with the string of receiver random bases such that each measured bit has a corresponding receiver random basis;
   receiving a string of transmitter random bases that corresponds with the string of receiver random bases;
   comparing the receiver random basis of each bit in the string of measured bits with a corresponding transmitter random basis; and
   discarding each bit in the string of measured bits where the receiver random basis fails to match the corresponding transmitter random basis to generate the binary bit stream.

3. The method of claim 1, wherein modifying the binary bit stream to form the modified bit stream includes:
   selecting a first string of bits from the binary bit stream;
   determining an error rate based on the first string of bits; and
   determining if the error rate exceeds a threshold.

4. The method of claim 3, wherein determining the error rate based on the first number of bits includes:
   transmitting the first string of bits;
   receiving a transmitter string of bits, the transmitter string of bits corresponding with the first string of bits; and
   determining the error rate based on differences between the first string of bits and the transmitter string of bits.

5. The method of claim 4, wherein determining the required level of security includes receiving a security level selection.

6. The method of claim 5, wherein the transmitter string of bits and the security level selection are received from a classical channel.

7. The method of claim 5, wherein determining the required level of security further includes determining a risk value based on the error rate.

8. The method of claim 7, wherein determining the required level of security further includes generating a weighted summation of the bit error rate, the risk value, and the security level selection.

9. The method of claim 3, wherein modifying the binary bit stream to form the modified bit stream further includes:
   discarding the binary bit stream when the error rate exceeds the threshold; and
   discarding the first string of bits when the error rate lies below the threshold to leave a second string of bits from the binary bit stream.

10. The method of claim 9, wherein modifying the binary bit stream to form the modified bit stream further includes error correcting the second string of bits to generate the modified bit stream.

11. The method of claim 1, wherein the privacy amplification algorithm includes a shift algorithm.

12. The method of claim 11, wherein the algorithm parameters include key length, key shift algorithm number, key shift direction, and key shift number.

13. The method of claim 1, wherein the privacy amplification algorithm includes a hash algorithm.

14. The method of claim 13, wherein the algorithm parameters include key length, number of binary bits per hash function coefficient, interception position from initial keys, and hash function serial number or hash function degree and coefficients.

15. An apparatus for quantum key distribution, the apparatus comprising:
    a memory; and
    a processor coupled to the memory, the processor to:
       receive a plurality of quantum states from a quantum channel;
       extract a binary bit stream from the plurality of quantum states;
       modify the binary bit stream to form a modified bit stream;
       determine a required level of security;
       determine a privacy amplification algorithm based on the required level of security;

extract an initial key and a number of parameter values of a corresponding number of algorithm parameters required by the privacy amplification algorithm from the modified bit stream, the number of privacy amplification parameters being transmitted in an anonymous way; and execute the privacy amplification algorithm based on the initial key and the parameter values to obtain a shared key.

16. The apparatus of claim 15, wherein to extract the binary bit stream from the plurality of quantum states the processor to further:

generate a string of receiver random bases;

measure the plurality of quantum states with the string of receiver random bases to generate a string of measured bits that corresponds with the string of receiver random bases such that each measured bit has a corresponding receiver random basis;

receive a string of transmitter random bases that corresponds with the string of receiver random bases;

compare the receiver random basis of each bit in the string of measured bits with a corresponding transmitter random basis; and discard each bit in the string of measured bits where the receiver random basis fails to match the corresponding transmitter random basis to generate the binary bit stream.

17. The apparatus of claim 15, wherein to modify the binary bit stream to form the modified bit stream, the processor to further:

select a first string of bits from the binary bit stream;
determine an error rate based on the first string of bits; and
determine if the error rate exceeds a threshold.

18. The apparatus of claim 17, wherein to determine the error rate based on the first number of bits includes:

transmitting the first string of bits;

receiving a transmitter string of bits, the transmitter string of bits corresponding with the first string of bits; and determining the error rate based on differences between the first string of bits and the transmitter string of bits.

19. The apparatus of claim 17, wherein to further modify the binary bit stream to form the modified bit stream, the process to further:

discard the binary bit stream when the error rate exceeds the threshold; and discard the first string of bits when the error rate lies below the threshold to leave a second string of bits from the binary bit stream.

20. The apparatus of claim 19, wherein to further modify the binary bit stream to form the modified bit stream, the processor to further error correct the second string of bits to generate the modified bit stream.

21. The apparatus of claim 15, wherein the privacy amplification algorithm includes a shift algorithm.

22. The apparatus of claim 21, wherein the transmitter string of bits and the security level selection are received from a classical channel.

23. The apparatus of claim 21, wherein to determine the required level of security, the processor to further determine a risk value based on the error rate.

24. The apparatus of claim 23, wherein to determine the required level of security, the processor to further generate a weighted summation of the bit error rate, the risk value, and the security level selection.

25. The apparatus of claim 15, wherein the privacy amplification algorithm includes a hash algorithm.

26. The apparatus of claim 25, wherein the algorithm parameters include key length, number of binary bits per each hash function coefficient, interception position from initial keys, and hash function serial number, or hash function degree and coefficients.

27. The apparatus of claim 26, wherein the algorithm parameters include key length, key shift algorithm number, key shift direction, and shift number.

28. A non-transitory computer-readable storage medium having embedded therein program instructions, when executed by one or more processors of a computer, causes the computer to execute a method for distributing a quantum key, the method comprising:

receiving a plurality of quantum states from a quantum channel;

extracting a binary bit stream from the plurality of quantum states;

modifying the binary bit stream to form a modified bit stream;

determining a required level of security;

determining a privacy amplification algorithm based on the required level of security;

extracting an initial key and a number of parameter values of a number of corresponding algorithm parameters required by the privacy amplification algorithm from the modified bit stream, the number of privacy amplification parameters being transmitted in an anonymous way; and executing the privacy amplification algorithm based on the initial key and the parameter values to obtain a shared key.

29. The medium of claim 28, wherein the privacy amplification algorithm includes a hash algorithm.

30. The medium of claim 29, wherein the algorithm parameters include key length, number of binary bits per hash function coefficient, interception position from initial keys, and hash function serial number or hash function degree and coefficients.

31. The medium of claim 28, wherein the privacy amplification algorithm includes a shift algorithm.

32. The medium of claim 31, wherein the algorithm parameters include key length, key shift algorithm number, key shift direction, and key shift number.

33. The medium of claim 28, wherein determining the required level of security includes receiving a security level selection.

34. The medium of claim 33, wherein determining the required level of security further includes determining a risk value based on the error rate.

35. The medium of claim 34, wherein determining the required level of security further includes generating a weighted summation of the bit error rate, the risk value, and the security level selection.

36. A method for distributing quantum keys, the method comprising:

transmitting, with a transmitter, a plurality of quantum states onto a quantum channel;

receiving, with a receiver, the plurality of quantum states from the quantum channel;

extracting, with the receiver, a binary bit stream from the plurality of quantum states;

modifying, with the receiver, the binary bit stream to form a modified bit stream;

determining, with the receiver, a required level of security;

determining, with the receiver, a privacy amplification algorithm based on the required level of security;

extracting, with the receiver, an initial key and a number of parameter values of a corresponding number of algorithm parameters required by the privacy amplification algorithm from the modified bit stream, the number of privacy amplification parameters being transmitted in an anonymous way; and executing, with the receiver, the privacy amplification algorithm based on the initial key and the number of parameter values to obtain a shared key.

37. The method of claim 36, the method further comprising:

determining, with the transmitter, the required level of security; and determining, with the transmitter, the privacy amplification algorithm based on the required level of security.

38. The method of claim 37, further comprising determining, with the transmitter, the number of algorithm parameters required by the privacy amplification algorithm.

39. The method of claim 38, further comprising generating an output bit string that includes a parameter bit string and a random key bit string, the parameter bit string including the number of algorithm parameters.

40. The method of claim 39, further comprising executing the privacy amplification algorithm based on the output bit string and the number of parameters to generate a transmitter bit string.

41. The method of claim 40, further comprising transmitting, with the transmitter, the transmitter bit string with a string of transmitter random bases as the plurality of quantum states.

42. The method of claim 37, further comprising transmitting, with the transmitter, the required level of service across a classical channel to the receiver.

* * * * *